March 12, 1957 — F. WRIGHT — 2,784,427
CAM ACTUATED LATERALLY RECIPROCATING TOOL CARRIER
Filed May 19, 1955 — 4 Sheets-Sheet 4

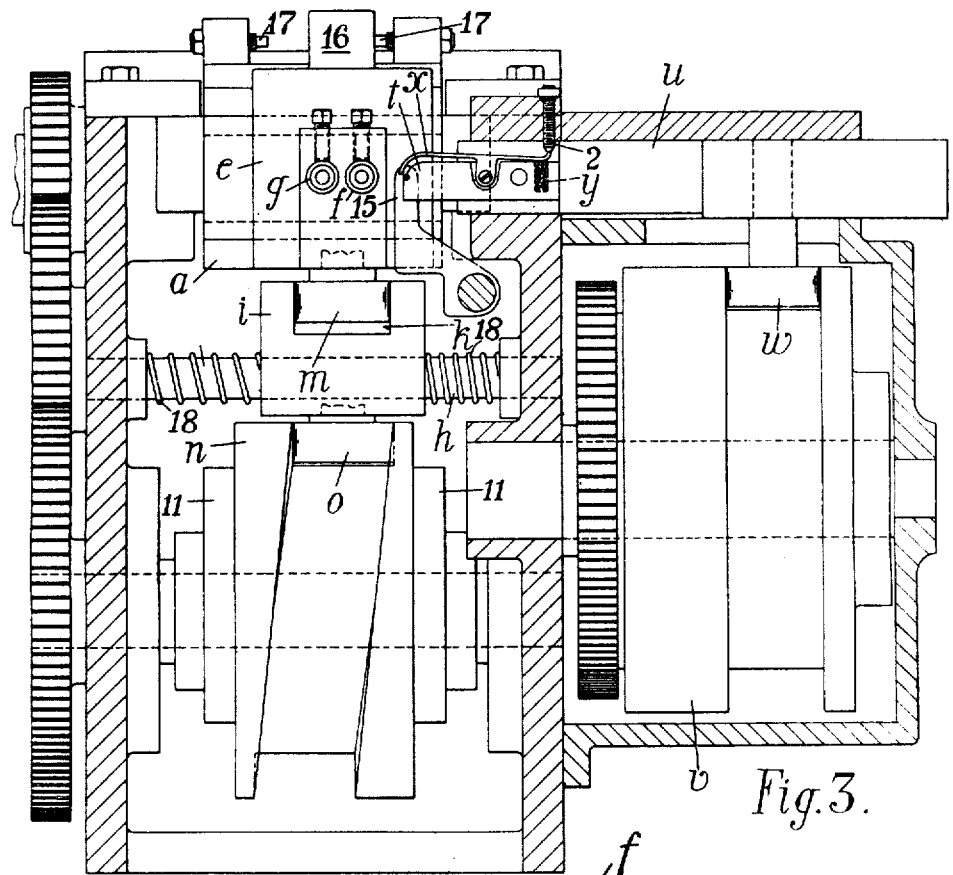
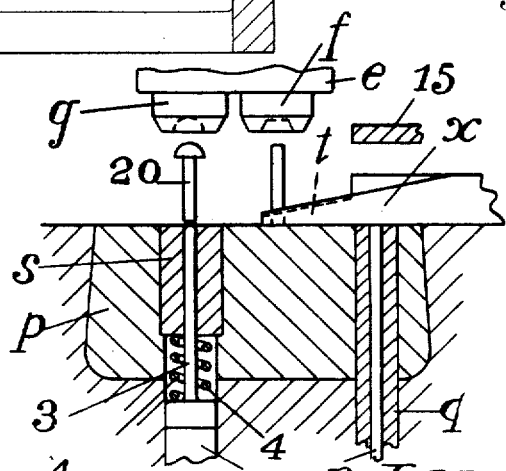
Fig. 3.
Fig. 4.

Inventor
F. Wright

United States Patent Office 2,784,427
Patented Mar. 12, 1957

2,784,427

CAM ACTUATED LATERALLY RECIPROCATING TOOL CARRIER

Frank Wright, Great Barr, Birmingham, England, assignor, by mesne assignments, to The Waterbury Farrel Foundry and Machine Co., Waterbury, Conn.

Application May 19, 1955, Serial No. 509,587

2 Claims. (Cl. 10—12.5)

This invention relates to the so-called heading machines used for forming heads on lengths of steel or other metal wire in the manufacture of small screws, rivets or like articles, the object of the invention being to provide an improved construction enabling the severing of work pieces from the wire stock and the heading of the work pieces to be effected at high speed.

A machine in accordance with the invention comprises the combination of a horizontal slide, a crank mechanism for actuating the slide, a heading-tool carrier mounted on one end of the slide and movable thereon in a direction at right angles to the direction of the slide, and a rotary cam for actuating the said tool carrier.

The machine also includes a reciprocatory slide adapted to carry a work-piece shearing blade, a rotary cam for actuating this slide, a work-piece gripper co-operating with the shearing blade for transferring a severed work piece from the severing to the heading position, and means for actuating the gripper.

The machine further includes a work piece ejector and a rotary cam for actuating the ejector.

Figure 1:
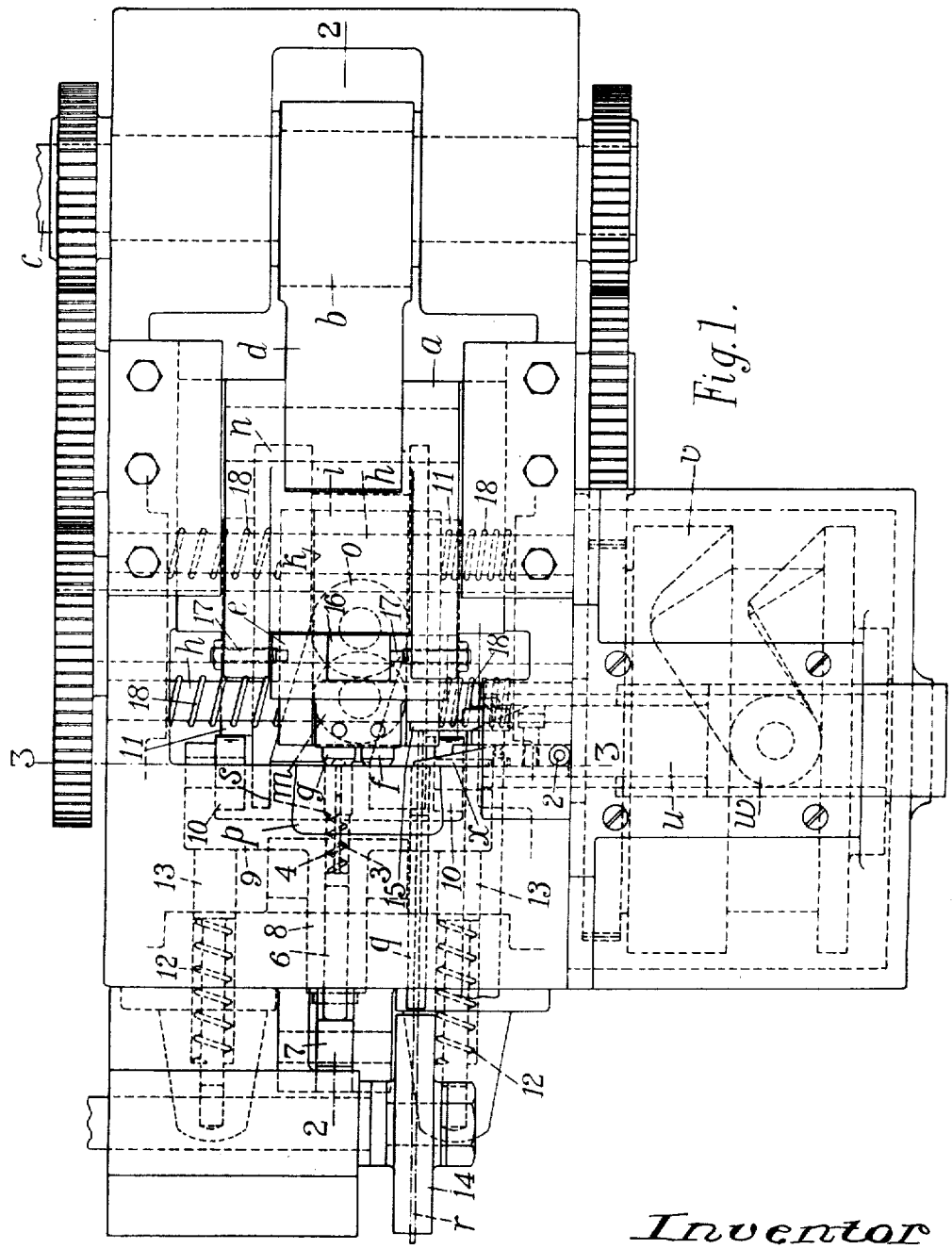
Figure 2:
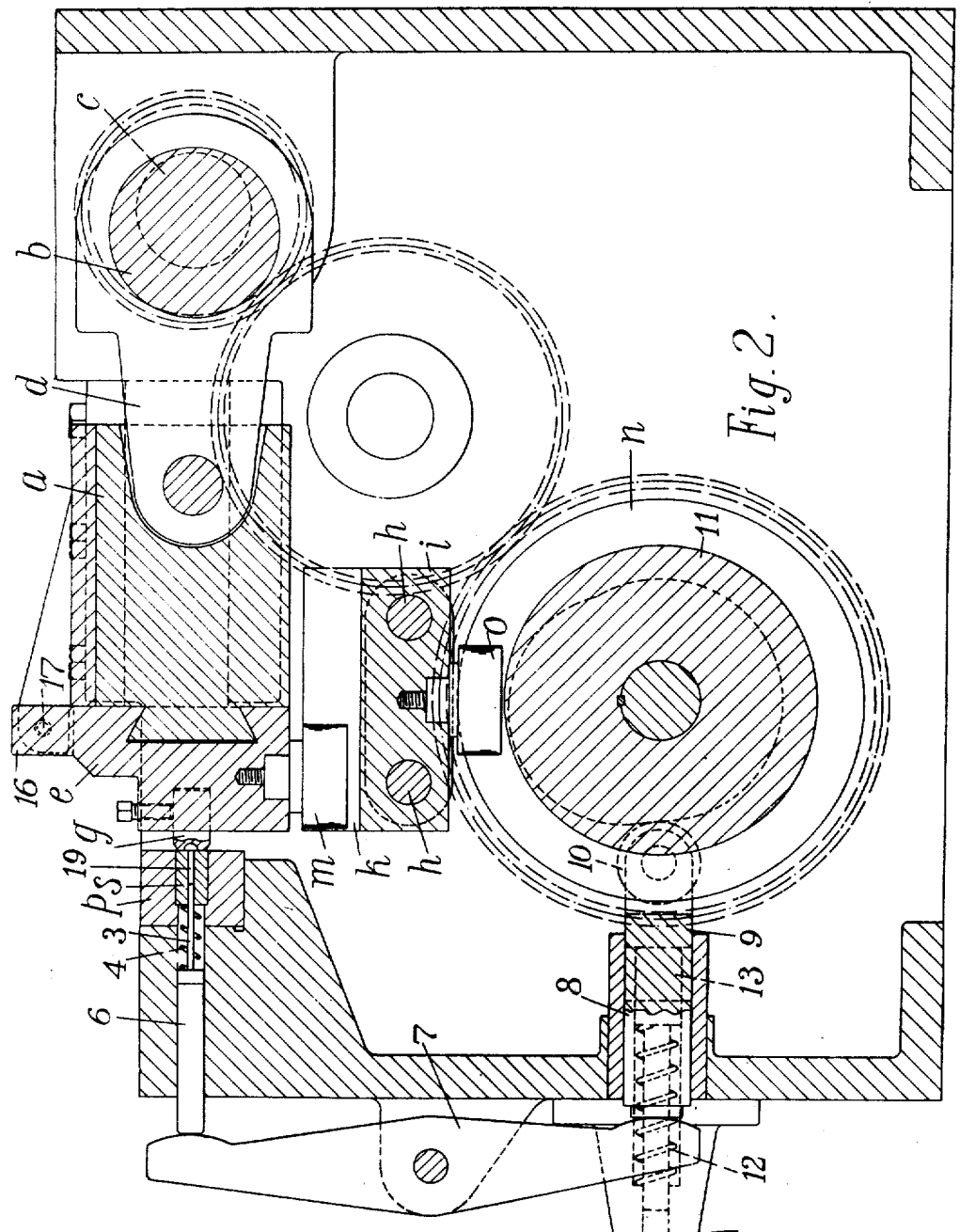

In the accompanying drawings:

Figure 1 is a plan of a machine embodying the invention, and Figures 2 and 3 are respectively sectional side and front elevations on the lines 2.2, and 3.3 of Figure 1.

Figures 4–7 illustrate the cycle of action of the machine.

Referring to the drawings, there is mounted on any convenient frame, a horizontal slide *a* (Figure 2), this being reciprocated by a crank *b* on a power-driven shaft *c*, the motion of the crank being transmitted to the slide by a connecting link *d*. On the front of the slide is mounted a reciprocatory carrier *e* for a pair of heading tools *f*, *g* arranged adjacent to each other, the direction of motion of the tool carrier being at right angles to that of the slide. Beneath the tool carrier there is mounted on a pair of guide rods *h* an actuator *i* for the tool carrier in which is formed a rectangular channel *k* which extends parallel with the direction of motion of the slide *a*, and in this channel is located a roller *m* attached to the underside of the tool carrier. Reciprocation of the actuator *i* on the said guide rods *h* is effected by a rotary cam *n* which engages a roller *o* on the actuator, and this motion is transmitted to the tool carrier *e* through the roller *m*.

On the frame of the machine adjacent to the tool carrier *e* is mounted a bolster *p* which carries a guide *q* (Figures 4–7) for the wire stock *r* from which the work pieces are to be severed, and a die *s* which supports the work pieces during the heading operations. Also in contact with the exposed face of the bolster *p* is arranged a reciprocatory severing blade *t* (Figures 1 and 3), this being attached to one end of a slide *u* which is actuated by a rotary cam *v*, through the medium of a roller *w* attached to the slide. On the forward end of the blade is formed a small notch, as will be seen in Figure 2, to receive the end of the stock wire to be severed, and on the blade is pivotally mounted a work-piece gripper *x* which is loaded by a spring *y*, for securing the severed work piece to the blade. Also on an adjacent part of the frame of the machine is arranged an adjustable stationary striker 2 (Figure 3) which can momentarily lift the operative end of the gripper while the wire stock is being fed into position prior to severance of the work piece.

There is also arranged in alignment with the rear end of the die *s*, a reciprocatory ejector 3 which is loaded by a spring 4 and which is actuated through a thrust piece 6 by a lever 7. The lever 7 is actuated by a thrust piece 8 formed on a cross bar 9 which at one end carries rollers 10, the latter co-operating with rotary cams 11. The rollers are held in contact with the cam by a pair of springs 12 acting on the said cross bar through plungers 13.

Any convenient arrangement of gear wheels is provided whereby the motions of the various cams are suitably co-ordinated for effecting the severing and heading operations in the required sequence.

In the foregoing there have been described the main and essential features of the machine. There will now be described certain details.

The feeding of the wire stock to the severing blade may be effected in any convenient manner. In the example illustrated the stock is fed by a pair of feed rollers (one of which 14 appears in Figure 1), these being arranged to exert between them a frictional grip on the wire and to advance its free end into contact with a stop 15 which determines the length of wire to be severed to form a work piece.

The slide *e* which carries the tools *f*, *g* is preferably provided with a projection 16 which by co-operation with a pair of adjustable stops 17 serves for effecting accurate location of the tools relatively to the die *s*. Also springs 18 are preferably mounted on the rods *h* for cushioning the tool slide actuator *i* at the ends of its reciprocatory movements.

Figure 5:
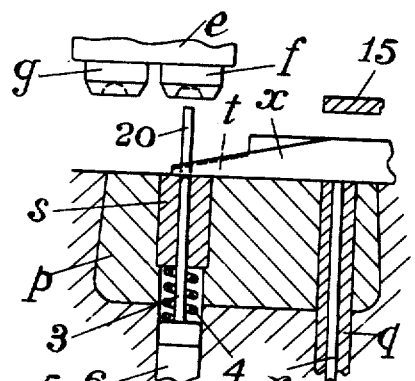
Figure 6:
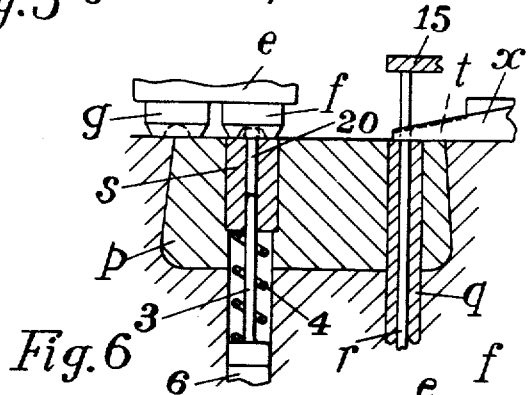
Figure 7:
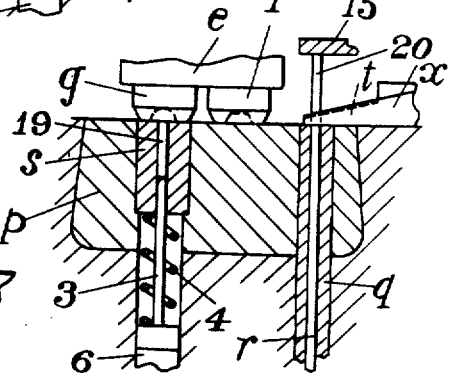

The cycle of action of the machines will be more readily followed by inspection of Figures 4–7. Looking first at Figure 7 it will be seen that the free end of the work stock has been fed across the severing blade into contact with the stop 15, and the tool *g* has completed the formation of a head on a work piece 19. By movement of the blade to the left another work piece 20 is severed from the stock, and while gripped between the gripper and blade is moved into alignment with the die *s* as shown in Figure 5, the tools having meanwhile been retracted and the finished work piece ejected. At the same time the tool carrier is actuated for bringing the tool *f* into its operative position. The tool *f* at this stage then pushes the work piece 20 into the die against the action of the ejector as shown in Figure 6 and effects a preliminary heading operation on the work piece. The severing blade is meanwhile returned to its initial position. The tools are then retracted, and the tool carrier is actuated for bringing the tool *g* into its operative position so that in the next advance of the tools the tool *g* can complete the formation of the head on the work piece 20. With the next retraction of the tool carrier the finished work piece is ejected from the die as shown in Figure 4, and meanwhile the next work piece has been severed and moved by the severing blade through a part of its travel towards the die as shown in Figure 4.

An essential feature of the present invention resides in the use of a rotary cam for actuating the tool carrier through the medium of an intermediate reciprocatory actuator as above described. This means enables high speed operation of the tool carrier to be effected in a simple and satisfactory manner. A further essential feature resides in the use of a rotary cam and slide for actuating the stock-severing blade. The invention is especially useful for effecting high-speed production of headed work pieces of small size.

Having thus described my invention what I claim as new and desire to secure by Letters Patent is:

1. A heading machine for forming heads on lengths of metal wire in the manufacture of small screws, rivets or the like, comprising in combination a horizontal reciprocatory slide, an actuating crank mechanism connected to said slide, a heading-tool carrier slidably mounted on one end of said slide and movable in a path at right angles to that of said slide, a rotary cam, and an actuator which is movable in a path parallel with that of said heading-tool carrier and through the medium of which said heading-tool carrier is movable by said cam, said actuator having therein a channel situated parallel with the path of said slide, and said heading-tool carrier having mounted thereon a roller engaging said channel.

2. A heading machine according to claim 1 and having in combination a second reciprocatory slide, a work-piece shearing blade operable by said second slide, a work-piece gripper arranged in association with said blade to cooperate therewith for transferring a severed work-piece from a severing to a heading position, a second rotary cam for actuating said second slide, a spring-loaded ejector for headed work-pieces, a third rotary cam, and means operable by said third rotary cam for actuating said ejector.

References Cited in the file of this patent

UNITED STATES PATENTS

| | | |
|---|---|---|
| 1,244,912 | Smith | Oct. 30, 1917 |
| 2,105,387 | Wilcox | Jan. 11, 1938 |
| 2,338,330 | Huebner | Jan. 4, 1944 |

FOREIGN PATENTS

| | | |
|---|---|---|
| 849,635 | Germany | July 17, 1952 |